United States Patent [19]

Lebault et al.

[11] 4,227,736
[45] Oct. 14, 1980

[54] CONVERTIBLE SEAT FOR AUTOMOBILE VEHICLES

[75] Inventors: Jean-Claude Lebault, Guitrancourt; Guy Rabouille, Courville, both of France

[73] Assignees: Automobiles Peugeot; Societe Anonyme Automobiles Citroen, both of Paris, France

[21] Appl. No.: 966,955

[22] Filed: Dec. 6, 1978

[30] Foreign Application Priority Data

Dec. 9, 1977 [FR] France .............................. 77 37199

[51] Int. Cl.³ .............................................. B60N 1/02
[52] U.S. Cl. .................................... 296/65 R; 297/331
[58] Field of Search .............. 296/65 R, 69; 297/331, 297/334, 378

[56] References Cited

U.S. PATENT DOCUMENTS

| | | | |
|---|---|---|---|
| 2,152,505 | 3/1939 | Stuart | 296/65 R |
| 3,171,684 | 3/1965 | Carte | 296/65 R |

FOREIGN PATENT DOCUMENTS 194939 3/1923 United Kingdom ................. 296/65 R

*Primary Examiner*—John J. Love
*Assistant Examiner*—John A. Carroll
*Attorney, Agent, or Firm*—Burns, Doane, Swecker & Mathis

[57] ABSTRACT

The seat structure comprises a seat proper and a backrest. The seat proper is mounted on the floor of the vehicle to pivot about a first transverse axis and the backrest is mounted on the seat proper to pivot about a second transverse axis. At least one link is connected at one end to the base part of the backrest to pivot about a third transverse axis and connected at the opposite end thereof to the floor of the vehicle to pivot about a fourth transverse axis. The seat proper and the link form two crossed arms of a device for deploying in the horizontal position the backrest relative to the seat proper upon a pivoting of the latter through about 180° about the first axis in the forward direction relative to the vehicle.

3 Claims, 7 Drawing Figures

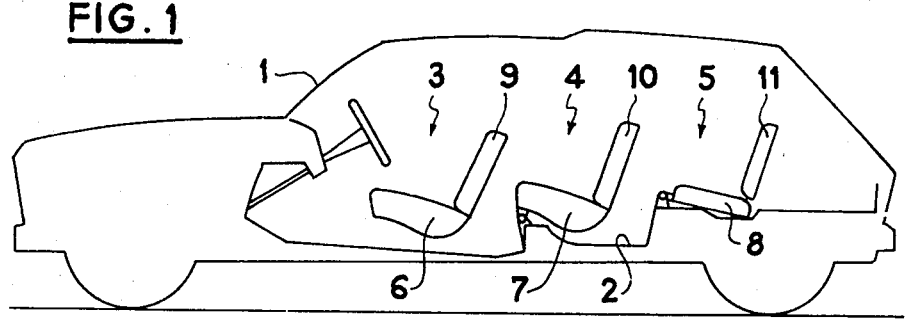
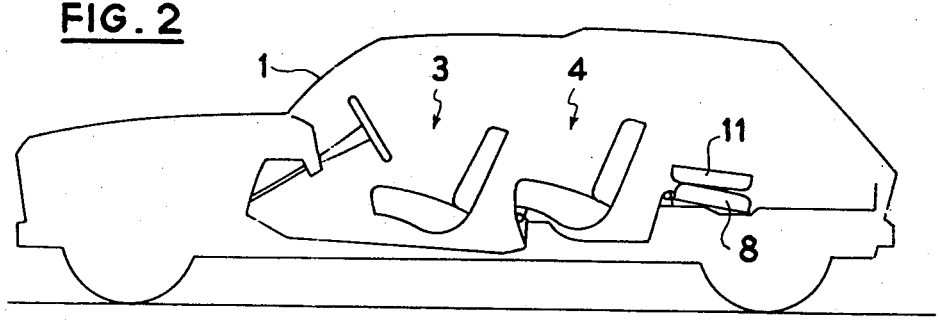
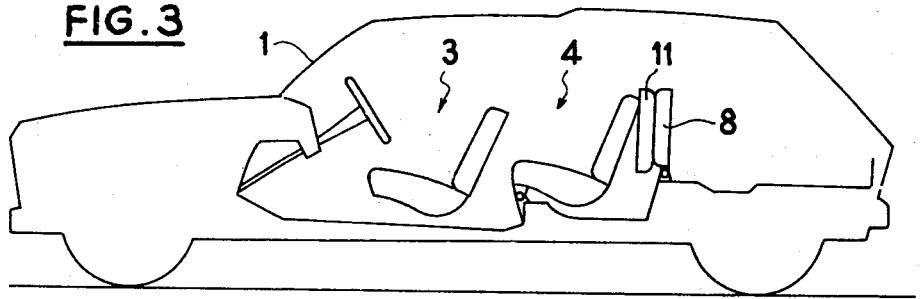
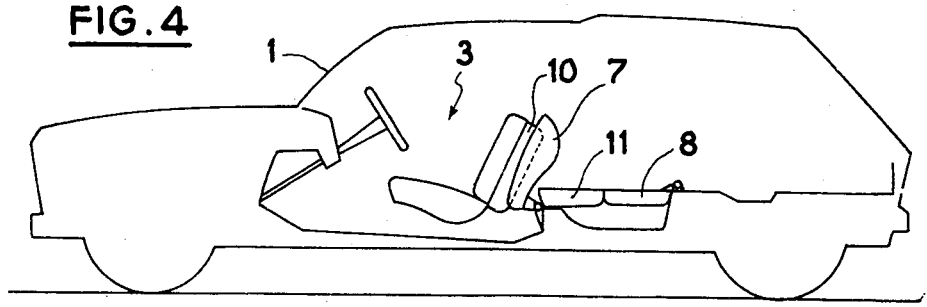

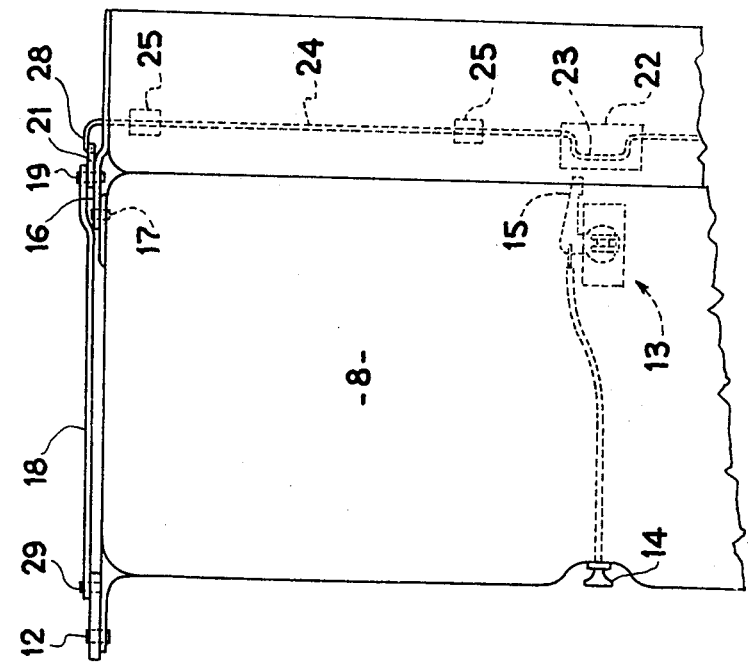
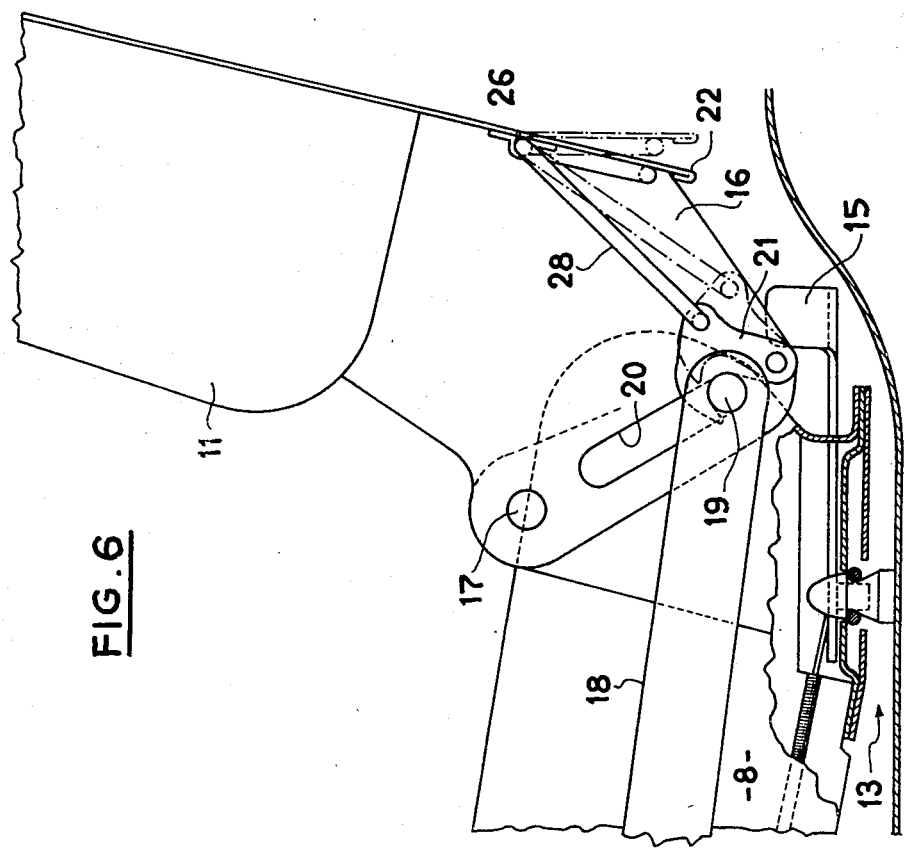

CONVERTIBLE SEAT FOR AUTOMOBILE VEHICLES

DESCRIPTION

The present invention relates to automobile vehicle seats arranged to assume different positions so as to enable the vehicle to be used for transporting passengers and goods. It is more particularly applicable to a third row of seats of a vehicle of the family type.

Various arrangements are known for folding up, folding over or raising the component parts of the seats so as to modify the space available for luggage.

In the case of a vehicle of the family type, the known arrangements do not permit obtaining by simple operations a continuous loading platform which extends in the place of the second and third rows of seats from the rear of the vehicle to the backrest of the first row of seats or front seats.

An object of the invention is to obtain this result.

According to the invention, there is provided a vehicle seat comprising a seat proper which is mounted in its front part on the floor to pivot about a first transverse axis, and a backrest which is mounted at its base on the seat proper to pivot about a second transverse axis, wherein there is provided a link which is connected to the base of the backrest to pivot about a third transverse axis and is connected to the floor to pivot about a fourth transverse axis, said seat proper and said link forming two crossed arms of a device deploying the backrest in a horizontal position relative to the seat proper when the seat proper is pivoted through an angle of about 180° in the forward direction.

The ensuing description will give an embodiment of the invention with reference to the accompanying drawings in which:

FIGS. 1 to 4 are diagrammatic views of the various positions that a third row of seats is capable of assuming in a vehicle of the family type arranged in accordance with the invention;

FIG. 6 is a detail view, to a larger scale, of the junction between the seat proper and the backrest of the seat shown in FIG. 5, and FIG. 7 is a partial top plan view of the third row of seats.

Figure 5:
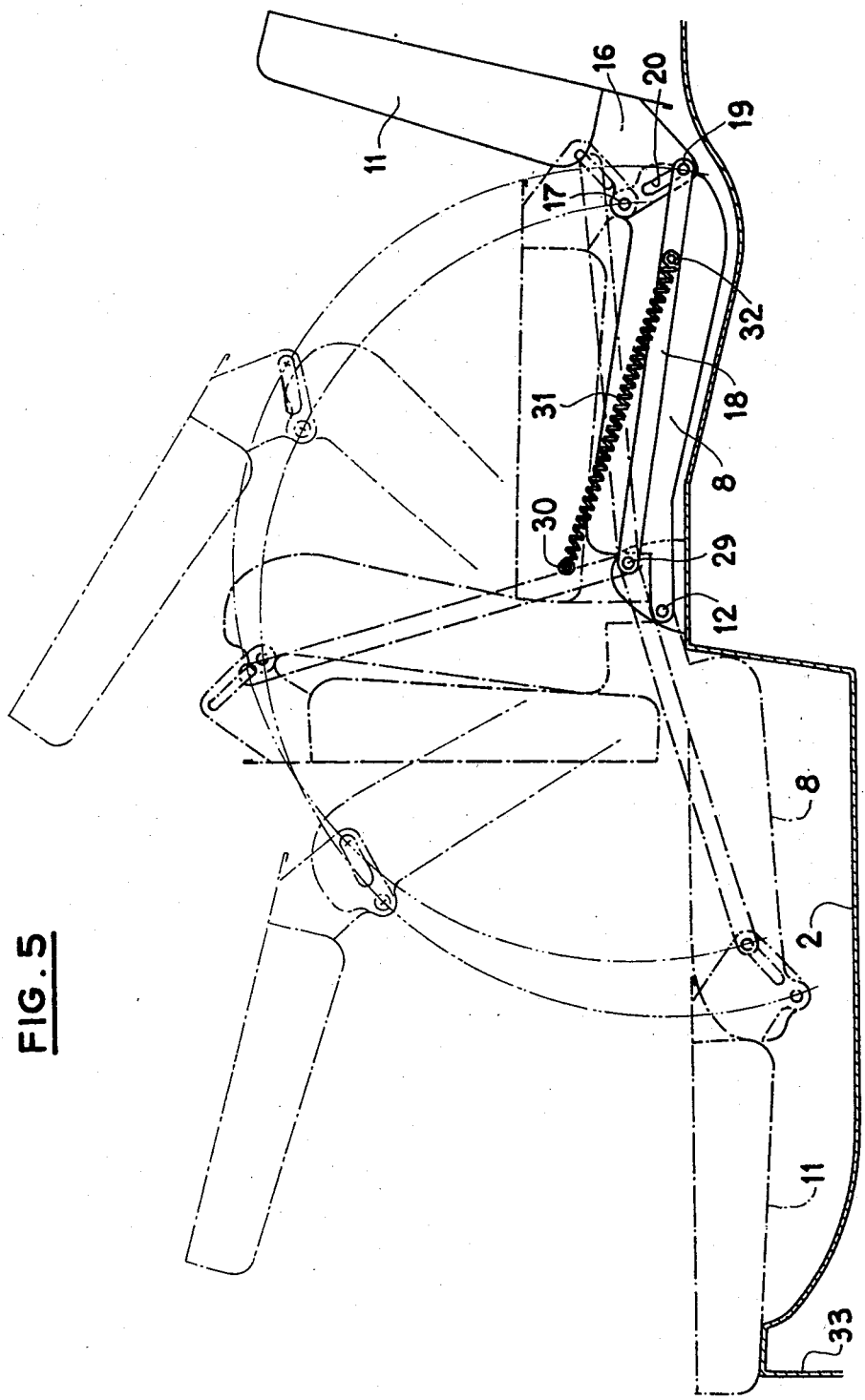
FIG. 5 is a side elevational view, to an enlarged scale, of the third row of seats in various positions.

FIG. 1 shows a compartment 1 of an automobile vehicle of the family type comprising, on a floor 2, three rows of seats 3, 4, 5, each consisting of a seat proper 6, 7 and 8 and a backrest 9, 10 and 11.

As shown in particular in FIG. 5, the seat proper 8 of the third row of seats 5 is mounted in its front part on the floor 2 to pivot about a first transverse axis embodied by a pin 12. It is maintained normally in position on the floor 2 by a lock 13 of known type such as a hood lock which is releasable either from the front by means of a pull member 14 or from the rear by means of a flat lever 15 (FIG. 7).

The backrest 11 carries at its base, on each side, a lateral member 16 whereby it is mounted on the seat proper 8 to pivot about a second transverse axis embodied by a pin 17.

On each side of the seat there is disposed a link 18. The latter carries at one end a pin 19 engaged in a slot 20 in the member 16 and immobilized at one end of this slot by a hook member 21 pivotally mounted on the member 16 (FIG. 6). A lever 22 is mounted on a cranked portion 23 of a rod 24 which is rotatably mounted in members 25 fixed to a rear plate 26 of the backrest 11.

The two end portions 28 of the rod 24 are bent at a right angle and are each pivotally mounted on a hook member 21. Thus, the two hook members can release the pins 19 by an action on the lever 22. The pins 19 constitute a third transverse axis.

The other end of the links 18 is mounted on the floor 2 to pivot about a fourth transverse axis embodied by a pin 29.

Each link 18 is connected to a point 30 of the body of the vehicle by balancing means, for example a spring 31 whose end opposed to its hooking point to the body is fixed at 32 to the link 18.

The point 30 is located above the pin 29 whereas the point 32 is located at a relatively short distance from the corresponding pin 19. In this way, the force exerted by the spring 31 is maximum for the extreme positions of the seat 5, which ensures a good balancing and facilitates the converting operations.

In order to use the vehicle in accordance with the diagram of FIG. 2, it is sufficient to disengage the hook members 21 by an action on the lever 22 and place them in the position shown in dot-dash lines in FIG. 6. The backrest 11 can then be folded over onto the seat proper 8. In the course of this movement, the pins 19 of the links 18 travel in the slots 20.

In order to use the vehicle in accordance with the diagram of FIG. 3, it is sufficient, in starting from the position of FIG. 2, to release the lock 13 and raise the assembly comprising the seat proper 8 and the backrest 11. In the course of this movement, the pins 19 continue to travel in the slots 20.

In order to use the vehicle in accordance with the diagram of FIG. 4, in starting from the position on FIG. 1, the backrest 10 is folded over onto the seat proper 7 of the seat 4 and then the whole is raised in the known manner in order to clear the place occupied by the second row of seats.

It is then sufficient to release the lock 13 without disengaging the hook members 21 and to pivot the seat proper 8 through about 180° in the forward direction. In the course of this movement, the links 18 cause the backrest 11 to be deployed which at the end of its travel, is placed in the extension of the seat proper 8 (FIG. 5 shows in dot-dash lines two intermediate positions). In this position, the end of the backrest 11 bears on a raised part 33 of the floor 2. In this way there is obtained a continuous loading platform which extends from the rear of the vehicle to the backrest 9 of the front seats.

This result is obtained very easily by particularly simple means which permit conserving the other positions of the rear seats (FIGS. 2 and 3).

Having now described our invention what we claim as new and desire to secure by Letters Patent is:

1. A seat structure comprising a seat proper, means for mounting a front part of the seat proper on the floor of a vehicle to pivot about a first transverse axis a backrest having a base part, lateral members mounting the base part of the backrest on the seat proper to pivot about a second transverse axis, at least one link which is connected adjacent a first end of the link to the base part of the backrest to pivot about a third transverse axis, means for connecting the link adjacent a second end of the link opposite said first end to the floor to pivot about a fourth transverse axis, the seat proper and the link forming two crossed arms of a device for deploying in the horizontal position the backrest relative to the seat proper upon a rotation of the seat proper through an angle of about 180° in a direction away from the backrest about said first axis, said third transverse axis being embodied by pins which are engaged in slots provided in said lateral members and hook members being respectively pivoted to the corresponding lateral members and being respectively engageable with the pins to hold the pins at one end of the slots, said hook members being part of a device for selectively immobilizing and releasing the pins relative to the slots.

2. A seat structure as claimed in claim 1, wherein two of said links are provided and the backrest carries, in its base part on each lateral side of the backrest, a respective lateral member mounting the backrest on the seat proper to pivot about the second transverse axis, said pins defining said third transverse axis being carried by said lateral members and receiving said links respectively adjacent opposite ends of the pins defining the third axis.

3. A seat structure as claimed in claim 1, comprising two of said link respectively located on lateral sides of the seat proper, elastically yieldable balancing means, means for connecting a first end of the balancing means to the vehicle, and means connecting a second end of the balancing means opposite said first end of the balancing means to each link at a point which is at a relatively short distance from said third transverse axis.

* * * * *